UNITED STATES PATENT OFFICE 2,300,570

METHOD OF PREPARING ALKYLOL CYANAMIDE CONDENSATION PRODUCTS

Ralph V. Heuser, Glenbrook, and Walter P. Ericks, Cos Cob, Conn., assignors to American Cyanamid Company, New York, N. Y., a corporation of Maine No Drawing. Application July 19, 1940, Serial No. 346,328

10 Claims. (Cl. 260—307)

The present invention relates to a method of preparing substituted cyanamides and their polymers. It is more particularly directed to a method of obtaining products by the condensation of free cyanamide with compounds containing an ethylene oxide ring.

According to the literature the product obtained in the reaction between ethylene oxide and a metal salt of cyanamide readily undergoes intramolecular rearrangement and can exist in several tautomeric forms of straight-chain and/or cyclic nature such as:

NC.NH.CH₂.CH₂.OH

HN:C:N.CH₂.CH₂.OH

H₂N.C:N.CH₂.CH₂.O
|_____|

HN:C.NH.CH₂.CH₂.O
|_____|

Although such designations as monoethylol cyanamide, hydroxyethyl cyanamide, cyanaminoethyl alcohol and 2-amino-oxazoline have been used to describe the chemical structure of the compound, the latter remains indefinite and the mechanism of rearrangement occurring within its molecules is obscure.

In the copending applications of W. P. Ericks, Serial Numbers 286,779, now Patent 2,244,421 and 289,399, there are described methods whereby an alkylol derivative of cyanamide is obtained when equimolecular ratios of an alkaline earth metal cyanamide and a compound containing an ethylene oxide ring are reacted together in a aqueous solution, and when two or more moles of the compound containing an ethylene oxide ring are reacted with each mole of the alkaline earth metal cyanamide there are obtained alkoxy-alkylol derivatives. As a consequence of tautomerism, either of these types of compounds may occur in several isomeric forms. Possibly 2, 3 or even 4 of these isomerides may coexist in a state of equilibrium. According to physical or chemical influence, one of these isomerides will predominate and, therefore, the reaction product is designated as a monomeric compound with an open chain structure of the following representative formula: N≡C.NH.R.OH, in which R is either an alkyl or an alkoxy alkyl group. These products are all extremely reactive and polymerize readily upon heating at a temperature exceeding 65° C. to the dimer which has the following probable structural formula:

N≡C.N.R.OH
|
HN=C.NH.R.OH in which R is as defined above. Upon additional heating, further polymerization may occur with the possible formation of trisubstituted triazines.

In preparing the alkylol cyanamides according to the methods of the above copending applications, several steps of operation are necessary in deriving the final product. For example, ethylene oxide is introduced into an aqueous slurry of calcium cyanamide, thus forming an aqueous solution of the alkylol cyanamide and an insoluble precipitate of calcium hydroxide. The mixture is filtered and the filter cake washed with water. A precipitant such as carbon dioxide is introduced into the combined filtrate and washings to throw out any residual calcium which is then filtered off. The alkylol cyanamide is obtained from the filtrate after removing the water by evaporation.

The alkylol cyanamides undergo hydrolysis and form compounds which were originally absent in the reaction mixture. For instance, the monoethylol cyanamide may first polymerize to the dimer, diethylol dicyandiamide, followed by hydrolysis according to the following reactions:

2NCNHCH₂CH₂OH  polymerization  NC—NCH₂CH₂OH
Monoethylol                     →             HN=CNHCH₂CH₂OH
cyanamide                                    Diethylol
                                             dicyandiamide

H₂O   H₂NCONCH₂CH₂OH
 →         |
       HN=CNHCH₂CH₂OH

Diethylol guanylurea

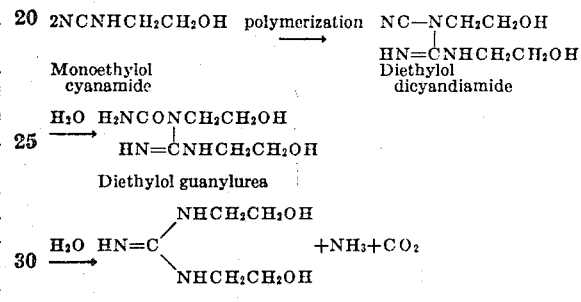

Diethylol guanidine

We have now discovered a method whereby we may obtain alkylol cyanamide condensation products which involves only one step of operation to derive the final product. This method consists in reacting free cyanamide with a compound containing an ethylene oxide ring at temperatures greater than 65° C. at atmospheric and elevated pressures. Due to the low boiling points of some of the lower alkylene oxides, as for example ethylene oxide having a boiling point of 13.5° C. at atmospheric pressure, their reaction with cyanamide necessitates the use of elevated pressures. However, compounds of higher boiling points containing an ethylene oxide ring, for example, glycidol, may be condensed with cyanamide at atmospheric pressure.

The present method of employing free cyanamide initially in a pure and anhydrous form rather than utilizing an aqueous slurry of the alkaline earth metal cyanamide has the advantage that it may be carried out in the absence of water so that the necessity of removing the insoluble inorganic salts and the hydrolysis of the reaction products are eliminated.

Inasmuch as the reaction is strongly exothermic it is desirable to employ means of checking the same and dissipating the heat from the reaction mixture. This may be accomplished by use of solvents or diluents to absorb the heat of reaction, or a part of the finished product from a previous batch may be recycled which would thus function as a heat buffer.

Water or other inert solvent or diluent, preferably of an organic nature, may be used to dissipate the heat of reaction. Such inert organic materials which boil above a temperature suitable for convenient operation (thus avoiding fire hazard and excessive pressure) include dioxane, dibutyl ether, ethyl amyl ether, phenyl ethyl ether, ethyl acetate, butyl acetate, octane, decane, dodecane, dichloropropane, chlorooctane, etc.

A convenient means of controlling the reaction in the absence of solvents or diluents involves the use of a reaction vessel containing a coil through which a heating medium such as hot water or steam is circulated during the period of raising the reaction mixture to the reaction temperature, and through which a cooling medium may be subsequently circuated for the purpose of absorbing the heat of reaction while the exothermic reaction is in progress.

The invention will be illustrated in greater detail by the preparation of products shown in the following examples.

*Example 1*

10.5 grams (0.25 mole) of cyanamide and 11.0 grams (0.25 mole) of ethylene oxide were charged into a steel bomb cooled to approximately 0° C. The bomb was equipped with heating and agitating means and the materials were reacted as follows:

| Time (min.) | Temperature | Pressure |
|---|---|---|
|  | °C. | Pounds/sq. in. |
|  | 17 | 8 |
| 5 | 25 | 11 |
| 30 | 55 | 35 |
| 45 | 63 | 49 |
| 55 | 72 | 62 |
| 60 | 78 | 72 |
| 65 | 84 | 103 |
| 66 | 87 | 123 |
| 67 | 90 | 115 |
| 70 | 93 | 98 |
| 90 | 95 | 37 |
| 95 | 90 | 18 |
| 115 | 90 | 5 |

Upon cooling, the product was a colorless viscous liquid which had no odor of ammonia and evolved no carbon dioxide on acidification.

*Example 2*

21 grams (0.5 mole) of cyanamide, 22 grams (0.5 mole) of ethylene oxide and 50 grams of water were placed in a pressure bomb provided with heating and agitating means. The reaction cycle was as follows:

| Time (min.) | Temperature | Pressure |
|---|---|---|
|  | °C. | Pounds/sq. in. |
|  | 12 | Not indicated |
| 10 | 30 | Not indicated |
| 15 | 44 | Not indicated |
| 20 | 50 | 8 |
| 25 | 56 | 12 |
| 35 | 56 | 15 |
| 40 | 60 | 17 |
| 45 | 65 | 22 |
| 50 | 71 | 27 |
| 51 | 75 | 35 |
| 52 | 86 | 42 |
| 53 | 100 | 10 |
| 55 | 100 | 5 |

The reaction product was evaporated in an air-drying oven at 50° C. The product was a pale yellow liquid.

*Example 3*

21 grams (0.5 mole) of cyanamide, 66 grams (1.5 moles) of ethylene oxide and 50 grams of water were placed in a pressure bomb provided with heating and agitating means. During the reaction cycle a gradual rise in pressure took place until a temperature of 80° C. was reached. At this point a rapid rise in temperature occurred to a maximum of about 138° C. The charge was slowly cooled to room temperature and evaporated in an air-drying oven at 50° C. The product was a viscous liquid which gave an odor of ammonia and evolved carbon dioxide upon acidification.

*Example 4*

21 grams (0.5 mole) of cyanamide, 22 grams (0.5 mole) of ethylene oxide and 50 grams of dioxane were placed in a steel bomb provided with heating and agitating means. The charge was heated to a temperature of about 110° C. within a period of 90 minutes. During this operation a maximum pressure of 100 pounds per square inch was attained. After cooling to room temperature the dioxane was evaporated. The product was a colorless viscous liquid which has no odor of ammonia and did not evolve carbon dioxide on acidification.

*Example 5*

10.5 grams (0.25 mole) of cyanamide, 58.05 grams (one mole) of 1,2-propylene oxide and 40 grams of water were charged into a pressure bomb provided with heating and agitating means. During the reaction cycle a gradual rise in pressure took place until a temperature of 111° C. was reached. Thereafter the pressure decreased gradually until none was indicated. The charge was cooled to room temperature, and the water removed by evaporation in an air-drying oven at 50° C. The product was a pale yellow viscous liquid.

*Example 6*

10.5 grams (0.25 mole) of cyanamide, 21.5 grams (0.276 mole) of isobutylene oxide and 40 grams of dioxane were heated in a steel bomb. During the reaction cycle a gradual rise in pressure took place until a temperature of 158° C. was reached, after which the reaction proceeded slowly to completion. The charge was cooled and the dioxane evaporated. The product was a colorless viscous liquid.

*Example 7*

A mixture of 42 grams (one mole) of cyanamide, 74.05 grams (one mole) of glycidol and 74 grams of water was charged into a vessel equipped with a thermometer, reflux condenser and mechanical stirrer. Upon heating the mixture of 105° C., a lively reaction took place and the heating was then discontinued until the reaction subsided. The mixture was refluxed at 105° C. for 30 minutes and then evaporated at 60° C. to remove the water. A pale yellow viscous liquid was obtained.

Similarly other alkylol cyanamide condensation products may be obtained by using as a starting material the corresponding compound having an ethylene oxide ring formation, and reacting the same with free cyanamide.

The products prepared according to this invention are of particular utility in the formulation of coating and molding compositions, as textile assistants, as plasticizers, as emulsifying agents for oils and fats, as dispersing agents, and as starting materials for the synthesis of artificial fibres, laminated materials, resins, adhesives and other useful products.

Condensation products of the alkylol cyanamides with organic monocarboxylic acids and amines such as described in the copending applications of W. P. Ericks, Serial Numbers 278,456 and 289,833, are surface-active agents of the cation-active type; that is to say, their surface-active properties are due to the electropositive portion of the molecule. For this reason they are well suited for wetting and softening wool, cotton, cellulose acetate, cellulose nitrate, viscose and similar threads and fabrics, as emulsifying agents for the preparation of emulsions of hydrocarbon oils, glyceride fats and oils and the like, as well as for breaking oil emulsions, in the formulation of printing inks, dye pastes, dye baths, as softeners for leather, as flotation agents, in the application of rubber latex emulsions to wool, cotton, and rayon textiles, in preparing emulsions of resins and the like.

While the invention has been described with particular reference to specific embodiments, it is to be understood that it is not to be limited thereto but is to be construed broadly and restricted solely by the scope of the appended claims.

What we claim is:

1. The method which comprises reacting cyanamide with a compound containing an ethylene oxide ring at a temperature greater than 65° C. and under a pressure sufficient to maintain the compound containing an ethylene oxide ring in the reaction zone.

2. Method of claim 1 in which the reaction is carried out in the presence of an inert diluent.

3. Method of claim 1 in which the reaction is carried out at a pressure substantially greater than atmospheric pressure.

4. The method which comprises reacting cyanamide with a compound containing an ethylene oxide ring in the presence of an inert diluent, at a temperature greater than 65° C. and under a pressure sufficient to maintain the compound containing an ethylene oxide ring in the reaction zone, removing the inert diluent and recovering the product.

5. Method of claim 4 in which the inert diluent is water.

6. Method of claim 4 in which the inert diluent is dioxane.

7. Method of claim 4 in which the reaction is carried out at a pressure substantially greater than atmospheric.

8. The method which comprises reacting one mole equivalent of cyanamide with at least one mole equivalent of ethylene oxide in the presence of an inert diluent at a temperature greater than 65° C. and at a pressure substantially greater than atmospheric; removing the inert diluent and recovering the product.

9. The method which comprises reacting one mole equivalent of cyanamide with at least one mole equivalent of 1,2-propylene oxide in the presence of an inert diluent at a temperature greater than 65° C. and at a pressure substantially greater than atmospheric, removing the inert diluent and recovering the product.

10. The method which comprises reacting one mole equivalent of cyanamide with at least one mole equivalent of glycidol in the presence of an inert diluent at a temperature greater than 65° C., removing the inert diluent and recovering the product.

RALPH V. HEUSER.
WALTER P. ERICKS.